United States Patent [19]

Majima

[11] Patent Number: 5,724,110
[45] Date of Patent: Mar. 3, 1998

[54] LIQUID CRYSTAL PANEL AND METHOD FOR PRODUCING THE SAME IN WHICH THE SEAL SECTION IS FORMED FROM A MIXTURE OF LIQUID CRYSTAL AND RESIN

[75] Inventor: Kenji Majima, Matsubara, Japan

[73] Assignee: Sharp Kabushiki Kaisha, Osaka, Japan

[21] Appl. No.: 447,223

[22] Filed: May 22, 1995

[30] Foreign Application Priority Data

May 27, 1994 [JP] Japan ................................. 6-115120

[51] Int. Cl.$^6$ ........................ G02F 1/1333; G02F 1/1339
[52] U.S. Cl. ............................ 349/86; 349/153; 349/190
[58] Field of Search ........................... 359/51, 52, 62, 359/80; 349/86, 92, 93, 94, 153, 190

[56] References Cited

U.S. PATENT DOCUMENTS

| | | | |
|---|---|---|---|
| 4,094,058 | 6/1978 | Yasutake et al. | 359/80 |
| 4,295,712 | 10/1981 | Ishiwatari | 359/81 |
| 4,579,423 | 4/1986 | Fergason | 359/52 |
| 4,671,618 | 6/1987 | Wu et al. | 359/52 |
| 4,815,826 | 3/1989 | Fergason | 359/52 |
| 4,890,902 | 1/1990 | Doane et al. | 359/52 |
| 4,891,152 | 1/1990 | Miller et al. | 252/299.01 |
| 4,948,232 | 8/1990 | Lange | 359/89 |
| 4,971,719 | 11/1990 | Vaz et al. | 252/299.5 |
| 5,015,074 | 5/1991 | Clerc et al. | 359/53 |

(List continued on next page.)

FOREIGN PATENT DOCUMENTS

| | | |
|---|---|---|
| 0552508 A1 | 7/1993 | European Pat. Off. . |
| 59-201021 | 11/1984 | Japan . |
| 61-205920 | 9/1986 | Japan . |
| 62-277412 | 12/1987 | Japan . |
| 63-264721 | 11/1988 | Japan . |
| 63-264722 | 11/1988 | Japan . |
| 63-264723 | 11/1988 | Japan . |
| 63-264724 | 11/1988 | Japan . |
| 63-298219 | 12/1988 | Japan . |
| 1-145635 | 6/1989 | Japan . |

(List continued on next page.)

OTHER PUBLICATIONS

Margerum et al, "Effects of Off–State Alignment in Polymer Dispersed Liquid Crystals", Liquid Crystals, vol. 5, No. 5, pp. 1477–1487.

Shimada et al, "Control of an Initial Orientation in Polymer Dispersed Liquid Crystal", The 17th Liquid Crystal Forum, pp. 320–321, 1991, partial English translation.

Yoshida et al, "A Full–Color TFT–LCD with a Polymer-dispersed Structure", Japan Display '92, pp. 631–634, S17–1.

Kamada et al, "Wide Viewing Angle Full–Color TFT LCDs", Japan Display '92, 886, PD–12.

Takatori et al, "A Complementary TN LCD with With-–Viewing–Angle Grayscale", Japan Display '92, pp. 591–594, S15–6.

Shimada et al, "Control of Polymer Orientation in Polymer Dispersed Liquid Crystal" (PDLC), Japanese Journal of Applied Physics, vol. 31, Pt. 2, No. 38, pp. L352–L354.

*Primary Examiner*—William L. Sikes
*Assistant Examiner*—Walter Malinowski
*Attorney, Agent, or Firm*—Nixon & Vanderhye, P.C.

[57] ABSTRACT

A liquid crystal panel including a liquid crystal material between two substrates assembled together by a sealing section which is interposed therebetween and surrounds the liquid crystal material is produced by a method including the steps of laminating two base substrates which are larger than the substrates of the liquid crystal panel in a completed state, leaving a gap between the two base substrate; filling the gap between the two base substrates with a mixture of a photocurable resin and a liquid crystal material, and irradiating a prescribed area of the mixture with light to cause phase separation of the photocurable resin from the liquid crystal material and to cure the photocurable resin, thereby forming a liquid crystal region and a sealing section which surrounds the liquid crystal region and assembling the two base substrates together; and cutting the base substrates into a plurality of liquid crystal panels.

7 Claims, 8 Drawing Sheets

U.S. PATENT DOCUMENTS

| | | | |
|---|---|---|---|
| 5,018,840 | 5/1991 | Ogawa | 359/51 |
| 5,089,904 | 2/1992 | Fergason | 359/52 |
| 5,096,282 | 3/1992 | Margerum et al. | 359/51 |
| 5,103,326 | 4/1992 | Fergason | 359/51 |
| 5,204,763 | 4/1993 | Hikmet | 359/51 |
| 5,210,630 | 5/1993 | Heynderickx et al. | 359/103 |
| 5,262,882 | 11/1993 | Kikmet | 359/51 |
| 5,274,481 | 12/1993 | Kim | 359/51 |
| 5,327,271 | 7/1994 | Takeuchi et al. | 359/51 |
| 5,333,074 | 7/1994 | Hikmet | 359/51 |
| 5,384,066 | 1/1995 | Poetsch et al. | 252/299.01 |
| 5,410,423 | 4/1995 | Furushima et al. | 349/190 |
| 5,450,220 | 9/1995 | Onishi et al. | 359/51 |
| 5,473,450 | 12/1995 | Yamada et al. | 359/51 |
| 5,492,582 | 2/1996 | Ide et al. | 359/80 |

FOREIGN PATENT DOCUMENTS

| | | | |
|---|---|---|---|
| 1-145636 | 6/1989 | Japan . | |
| 1-269922 | 10/1989 | Japan . | |
| 2-28284 | 1/1990 | Japan . | |
| 2-75688 | 3/1990 | Japan . | |
| 2-85822 | 3/1990 | Japan . | |
| 2-99920 | 4/1990 | Japan . | |
| 2-116824 | 5/1990 | Japan . | |
| 2-153318 | 6/1990 | Japan . | |
| 2-153319 | 6/1990 | Japan . | |
| 2-272422 | 11/1990 | Japan . | |
| 2-272423 | 11/1990 | Japan . | |
| 2-272424 | 11/1990 | Japan . | |
| 3-46621 | 2/1991 | Japan . | |
| 3-59515 | 3/1991 | Japan . | |
| 3-61925 | 3/1991 | Japan . | |
| 3-72317 | 3/1991 | Japan . | |
| 3-192334 | 8/1991 | Japan . | |
| 3-278024 | 12/1991 | Japan . | |
| 4-14015 | 1/1992 | Japan . | |
| 4-31823 | 2/1992 | Japan . | |
| 4-31824 | 2/1992 | Japan . | |
| 4-39622 | 2/1992 | Japan . | |
| 4-39623 | 2/1992 | Japan . | |
| 5-203928 | 8/1993 | Japan | 359/80 |
| 5-232422 | 9/1993 | Japan . | |
| 1376926 | 12/1974 | United Kingdom . | |
| WO 89/09807 | 10/1989 | WIPO . | |

LIQUID CRYSTAL PANEL AND METHOD FOR PRODUCING THE SAME IN WHICH THE SEAL SECTION IS FORMED FROM A MIXTURE OF LIQUID CRYSTAL AND RESIN

BACKGROUND OF THE INVENTION

1. Field of the Invention

The present invention relates to a liquid crystal panel and a method for producing the same. In particular, the present invention relates to a liquid crystal panel including a liquid crystal section interposed between a pair of substrates, opposed to each other, the liquid crystal section being surrounded by a wall of a photocurable resin formed by phase separation of the photocurable resin from a liquid crystal material, and to a method for producing such a liquid crystal panel.

2. Description of the Related Art

Conventionally, liquid crystal panels are produced by (1) forming a pattern for a plurality of liquid crystal panels on one of a pair of large base substrates formed of, for example, glass, (2) assembling the base substrates with a sealing resin which is provided in a prescribed pattern, (3) cutting the assembled base substrates into a plurality of panels using a scribing method with a diamond cutter or the like, and (4) injecting a liquid crystal material into the panels, and (5) sealing the panels.

Recently, active matrix type liquid crystal panels including high performance thin film transistors as active elements formed on one of a pair of base substrates have been actively developed. In order to produce such an active matrix type liquid crystal panel, one of the base substrates needs to be heated to a high temperature for formation of the thin film transistors thereon. For this purpose, quartz glass or silicon is used as the base substrate, but such materials are difficult to be cut using a scribing method. The base substrates formed of one of such materials are cut using a dicing method, by which cutting is performed by rotating a disc-shaped rubstone.

In both of the above-described methods, injection of the liquid crystal material and sealing are performed after the assembled base substrates are cut into a plurality of liquid crystal panels. Accordingly, the number of production steps after the cutting of the base substrates increases in correspondence with the desired number of liquid crystal panels. Further, the liquid crystal panels are desired in various sizes. The liquid crystal panels of various sizes require different apparatuses for injection of a liquid crystal material and sealing in correspondence with the respective sizes. Designing, installment, use and maintenance of such different apparatuses is time and labor-consuming and thus increases production cost.

In the case where a liquid crystal panel is obtained as a result of cutting using a dicing method, heat is generated during dicing. In order to avoid excessive heating, dicing is performed while pouring cooling water on the faces exposed to dicing. At this point, the liquid crystal material has not been injected yet to the cells in the liquid crystal panels, and thus the liquid crystal panels are open at the injection openings thereof. Accordingly, the cooling water goes into the liquid crystal panels.

One possible path for entry of the cooling water into the liquid crystal panels is an end face of the assembled base substrates. Another possible path is a groove which is formed on a lower base substrate when dicing of an upper base substrate is performed at a depth which is greater than the thickness of the upper base substrate. In a method proposed in Japanese Laid-Open Patent Publication Nos. 63-298219 and 5-232422 in order to prevent the cooling water from going into the liquid crystal panels, the base substrates are assembled with a dummy seal formed in an area of the substrates which will not contribute to display and dicing is performed after the dummy seal is cured.

Such a method prevents the cooling water from going into the liquid crystal panels to some extent. However, a dicing method still has the following problems. If dicing is performed excessively deep, the cooling water still goes into the liquid crystal panels. Excessively deep dicing also makes the base substrates vulnerable against breakage. If dicing is performed excessively shallow, the base substrates are not cut sufficiently. Accordingly, the stress which is applied after the dicing to completely cut the base substrates tends to be excessive, which also breaks the base substrates.

As is described above, conventional liquid crystal panels and production methods thereof do not essentially prevent the cooling water from going into the liquid crystal panels or simplify the cutting process.

SUMMARY OF THE INVENTION

A liquid crystal panel according to the present invention including a liquid crystal material between two substrates assembled together by a sealing section which is interposed therebetween and surrounds the liquid crystal material is produced by a method including the steps of laminating two base substrates which are larger than the substrates of the liquid crystal panel in a completed state, leaving a gap between the two base substrates; filling the gap between the two base substrates with a mixture of a photocurable resin and a liquid crystal material, and irradiating a prescribed area of the mixture with light to cause phase separation of the photocurable resin from the liquid crystal material and to cure the photocurable resin, thereby forming a liquid crystal region and a sealing section which surrounds the liquid crystal region and assembling the two base substrates together; and cutting the base substrates into a plurality of liquid crystal panels.

In one embodiment of the invention, an injection opening formed in the sealing section through which the mixture is injected is sealed by the photocurable resin.

According to another aspect of the invention, a method for producing a liquid crystal panel including a liquid crystal material between two substrates assembled together by a sealing section which is interposed there between and surrounds the liquid crystal material includes the steps of laminating two base substrates which are larger than the substrates of the liquid crystal panel in a completed state, leaving a gap between the two base substrates; and filling the gap between the two base substrates with a mixture of a photocurable resin and a liquid crystal material, and irradiating a prescribed area of the mixture with light to cause phase separation of the photocurable resin from the liquid crystal material and to cure the photocurable resin, thereby forming a liquid crystal region and a sealing section which surrounds the liquid crystal region and assembling the two base substrates together.

In one embodiment of the invention, an injection opening formed in the sealing section is sealed by curing the photocurable resin.

In one embodiment of the invention, the above-described method further includes the step of cutting the base substrates which are assembled together into a plurality of liquid crystal panels while cooling with water after the sealing section is formed.

Thus, the invention described herein makes possible the advantages of (1) providing a method for producing a liquid crystal panel which eliminates the necessity of injecting a liquid crystal material into each of a plurality of liquid crystal panels after a cutting process, thus significantly reducing the number of production steps and raising production yield, (2) providing a method for producing a liquid crystal panel which eliminates the necessity of preparing an apparatus for injection of a liquid crystal material for each of the plurality of liquid crystal panels, thus significantly reducing production cost, (3) providing a method for producing a liquid crystal panel which prevents cooling water and dust from going into the gap between a pair of base substrates which are assembled together while such a pair of base substrates are cut into a plurality of liquid crystal panels, thus enhancing the quality of the resultant liquid crystal panel, (4) providing a method for producing a liquid crystal panel which provides a large selection of usable cutting methods, and (5) a liquid crystal panel produced by such a method.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
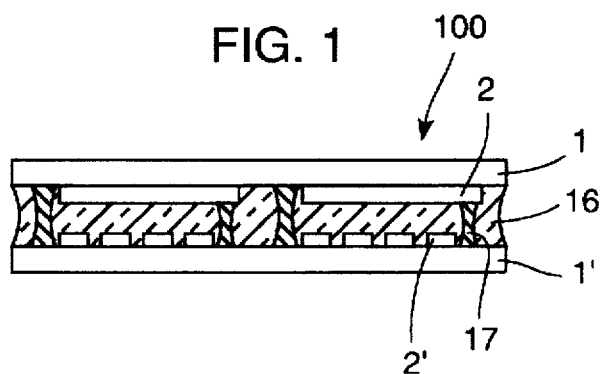
FIG. 1 is a schematic cross sectional view of an assembly from which a plurality of liquid crystal panels in a first example according to the present invention are to be obtained.

A liquid crystal panel in a first example according to the present invention will be described with reference to FIG. 1. FIG. 1 is a schematic cross sectional view of an assembly 100 from which a plurality of liquid crystal panels in the first example according to the present invention are to be obtained. In this specification, "laminate" refers to simply putting one base substrate on another substrate; "assemble" refers to putting two base substrates together into an integral body; and an "assembly" refers to an integral body including the two base substrates and liquid crystal regions provided therebetween.

The assembly 100 includes two base substrates 1 and 1' located opposed to each other. In this example, the base substrate 1 is an upper substrate, and the base substrate 1' is a lower substrate. Pixel electrodes 2 are located on the base substrate 1, and pixel electrodes 2' are located on the base substrate 1'. The pixel electrodes 2 and 2' are patterned as prescribed. The base substrates 1 and 1' are assembled by sealing sections 17, each of which surrounds a liquid crystal region 16. Each sealing section 17 is a wall of a photocurable resin which is formed by separating the photocurable resin from a liquid crystal material (phase separation) and curing the photocurable resin. The liquid crystal regions 16 are formed of the liquid crystal material also as a result of the phase separation.

At least one of the two base substrates is transparent. The base substrates are formed of, for example, low alkali glass, quartz glass, silicon, a PET film. The thickness of each base substrate is preferably 1.0 to 1.2 mm. The shape of the base substrates, which depends on the use, may be rectangular, substantially circular, or substantially polygonal.

The pixel electrodes 2 and 2' are formed of, for example, indium tin oxide (hereinafter, referred to as "ITO") or aluminium. The pixel electrodes 2 and 2' are formed by depositing one of the above-mentioned materials to a prescribed thickness on the respective base substrates 1 and 1' and patterning the material into a prescribed pattern by photolithography, screen printing, or the like. Photolithography is preferable. The thickness of each pixel electrode is preferably 0.05 to 0.15 µm.

Although not shown in FIG. 1, the assembly 100 preferably includes alignment layers at prescribed positions of the base substrates 1 and 1'. The alignment layers are preferably formed of a polyimide resin or the like by flexography or the like. The thickness of each alignment layer is preferably 0.07 to 0.09µm. The alignment layers are preferably treated by rubbing method for orientation.

The liquid crystal material and the photocurable resin are first injected into a gap between the two base substrates in the form of a mixture thereof. The liquid crystal material is an organic mixture which behaves like liquid crystal at room temperature and the vicinity thereof. Any known such material may be used. For example, a nematic liquid crystal material, a cholesteric liquid crystal material, a smectic liquid crystal material, a ferroelectric liquid crystal material, or a discotic liquid crystal material may be used. Such liquid crystal materials may be used independently or in combination of two or more. Especially, use of a nematic liquid crystal material or use of a mixture of a nematic liquid crystal material and a cholesteric liquid crystal material is preferable. Further, a liquid crystal material which is resistant against chemical reaction is preferable. In practice, a liquid crystal material containing a functional group such as fluorine atoms in liquid crystal molecules, for example, ZLI-4801-000, ZLI-4801-001 or ZLI-4792 produced by Merck & Co., Inc is preferable used.

A photocurable resin is prepared by polymerizing photocurable monomers by a known method. Examples of photocurable monomers are acrylic acid and methacrylic acid, esters thereof, each of which contains an alkyl group, an aryl group, or a cycloalkyl group including three or more carbon atoms, and halides thereof. Such photocurable monomers are, for example, isobutyl acrylate, stearyl acrylate, lauryl acrylate, isoamyl acrylate, 2-ethylhexyl acrylate, n-butyl methacrylate, n-lauryl methacrylate, tridecyl methacrylate, n-stearyl methacrylate, n-cyclohexyl methacrylate, benzyl methacrylate, isobornyl methacrylate, 2-phenoxyethyl methacrylate, 2,2,3,4,4,4-hexafluorobutyl methacrylate, 2,2,3,4,4,4-hexachlorobutyl methacrylate, 2,2,3,3-tetrachloropropyl methacrylate, 2,2,3,3-tetrachloropropyl methacrylate, perfluorooctylethyl methacrylate, perfluorooctylethyl acrylate, and perchlorooctylethylmeth acrylate. Polyfunctional compounds may also be used. Polyfunctional compounds are, for example, bisphenol-A diacrylate, bisphenol-A dimethacrylate, 1,4-butanediol dimethacrylate, 1,6-hexanediol dimethacrylate, trimethylolpropane triacrylate, and tetramethylolmethane tetraacrylate. Such monomers and polyfunctional compounds may be used independently or in a combination of two or more.

If necessary, a photocurable catalyst, chiral dopant, or the like may be added to a mixture of the above-mentioned liquid crystal materials and photocurable resins.

The sealing section 17 (hereinafter, also referred to as the "wall 17") of a photocurable resin and the liquid crystal region 16 are formed in the following manner.

First, an area of a mixture of a photocurable resin and a liquid crystal material where the sealing section 17 is to be formed is irradiated with light. The photocurable resin in the area irradiated with light (hereinafter, referred to as the "irradiated area") reacts to the light, namely, is cured, and a core for forming the wall 17 is formed. Due to the reaction of the photocurable resin with the light, the concentration of the photocurable resin in the irradiated area decreases. Thus, the photocurable resin obtains a concentration gradient. By the concentration gradient, the photocurable resin in the remaining area which has not been irradiated with light (hereinafter, referred to as the "non-irradiated area") moves to the irradiated area which has a lower concentration than the concentration of the non-irradiated area. The photocurable resin which has moved to the irradiated area reacts to the light. Such a process is repeated, thereby forming the wall 17. The liquid crystal material which remains in the non-irradiated area without moving becomes the liquid crystal regions 16.

The light is radiated to the mixture, for example, by using a photomask, or by spot exposure using an optical fiber, an optical system including a reducing lens having a large aperture diameter, or the like.

Figure 2:
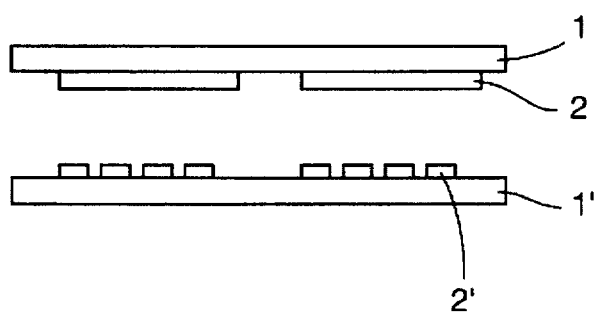
FIG. 2 is a schematic cross sectional view illustrating a step of forming pixel electrodes on a pair of base substrates in a method for producing a liquid crystal panel in the first example.
Figure 3:
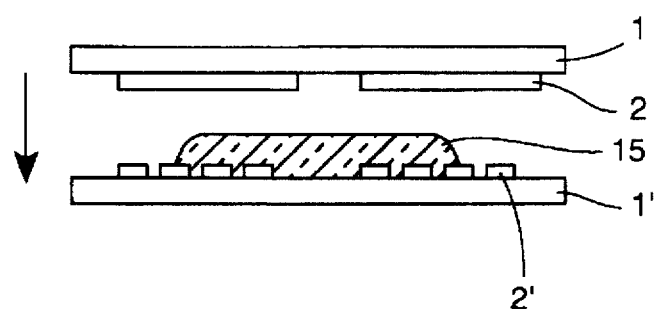
FIG. 3 is a schematic cross sectional view illustrating the step of providing a mixture of a photocurable resin and a liquid crystal material between the pair of base substrates in a method for producing a liquid crystal panel in the first example.
Figure 4:
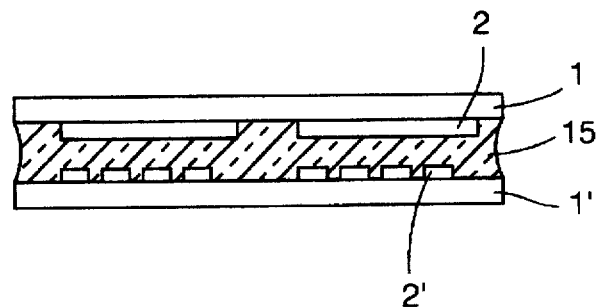
FIG. 4 is a schematic cross sectional view illustrating the step of extending the mixture shown in FIG. 3 between the pair of base substrates in a method for producing a liquid crystal panel in the first example.

With reference to FIGS. 2 through 7, 8A and 8B, an example of a method for producing a liquid crystal panel according to the present invention will be described. FIGS. 2 through 4 schematically illustrate different steps for producing the liquid crystal panel.

FIG. 2 is a cross sectional view of the base substrates 1 and 1' and the pixel electrodes 2 and 2' before a liquid crystal material is injected. The base substrates 1 and 1' are each formed of a low alkali glass plate having a thickness of 1.1 mm (for example, 7059 produced by Corning, Inc.). ITO is deposited on the base substrates 1 and 1' to a thickness of 0.1 µm and patterned to a prescribed pattern by photolithography, thereby forming the pixel electrodes 2 and 2'.

Although not shown in FIG. 2, alignment layers are formed of a polyimide resin (for example, Optomer AL-1051 produced by Japan Synthetic Rubber Co., Ltd.) on the base substrates 1 and 1' at prescribed positions in a thickness of 0.1 µm by flexography. The alignment layers cover the pixel electrodes 2 and 2'. Then, alignment layers are treated for orientation so that the liquid crystal molecules which are to be interposed between the base substrates 1 and 1' after assembly thereof will be twisted at 90°. Next, spacers and a mixture 15 (FIG. 3) of a photocurable resin and a liquid crystal material are interposed between the base substrates 1 and 1'. The mixture is prepared by mixing 0.12 g of a photocurable resin (R684 produced by Nippon Kayaku Co., LTD.), 0.05 g of p-phenylstyrene, 0.75 g of isobornyl methacrylate, 4 g of a liquid crystal material (ZLI-4792 produced by Merck & Co., Inc.), and 0.0025 g of a photocurable catalyst (Irugacur 651 produced by Ciba-Geigy Corporation).

As is shown in FIG. 3, the mixture 15 is dropped at a central area of one of the base substrates 1 and 1'. Then, as is shown in FIG. 4, the base substrates 1 and 1' are assembled together to extend the mixture 15 to the entire area of a gap between the base substrates 1 and 1'.

Figure 5:
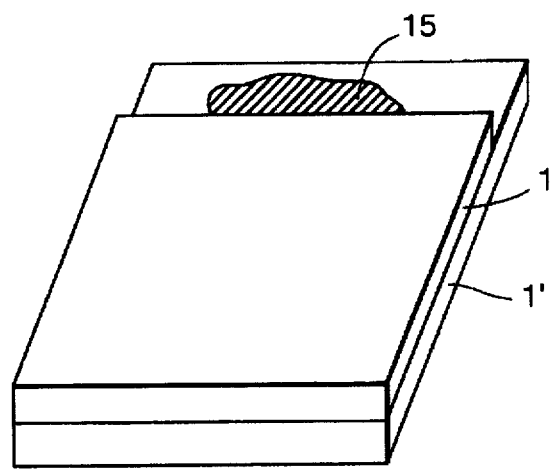
FIG. 5 is a schematic isometric view illustrating the step of extending the mixture between the two base substrates in a method in a modification of the first example according to the present invention.

In an alternative method, as is shown in FIG. 5, one of the base substrates (in this case, the base substrate 1') is formed to be larger than the other base substrate (in this case, the base substrate 1). The mixture 15 is dropped to an area of the base substrate 1' which is not covered with the base substrate 1. The mixture 15 is then extended to the entire area between the base substrates 1 and 1', utilizing capillarity.

Figure 6:
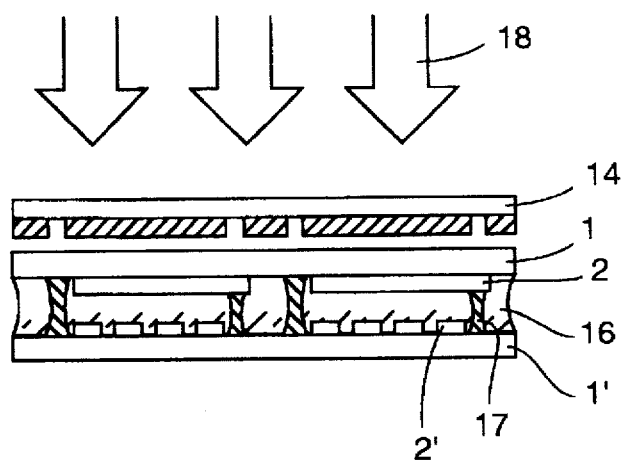
FIG. 6 is a schematic cross sectional view illustrating the step of forming a wall of a photocurable resin and a liquid crystal region in a method for producing a liquid crystal panel in the first example.

Next, as is shown in FIG. 6, a photomask 14 is located above the upper base substrate 1. The photomask 14 is designed to allow light to be radiated only to areas of the mixture 15 in which the sealing sections 17 are to be formed. The mixture 15 is irradiated with light 18 through the photomask 14, thereby forming a structure which includes a photocurable resin phase and a liquid crystal phase and also curing the photocurable resin phase. As a result, the walls 17 of the photocurable resin are formed in the irradiated areas, and the liquid crystal regions 16 are formed in the non-irradiated areas.

As a light source, a metal halide lamp, high pressure mercury lamp, or the like may be used. In this example, the irradiation is performed using a metal halide lamp, at an intensity of 10 mW/cm$^2$ for 10 minutes.

In the liquid crystal regions 16, the liquid crystal molecules are twisted at 90° due to the alignment layers formed of a polyimide resin or the like. In other words, the liquid crystal molecules are in the same state as on the display electrodes in a twisted nematic type liquid crystal panel produced by a known technology.

Figure 7:
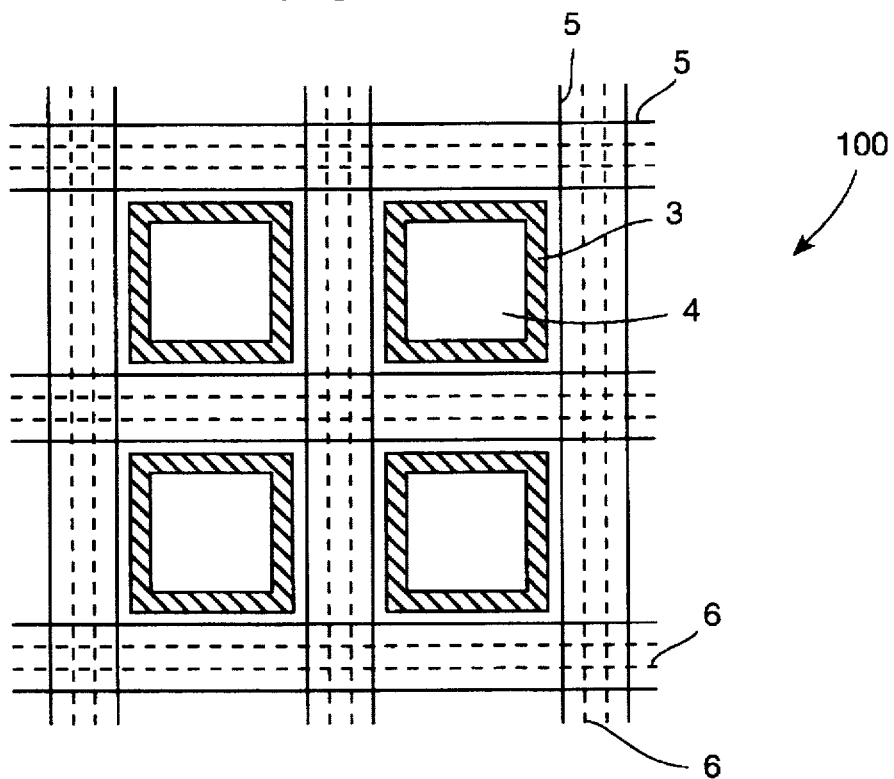
FIG. 7 is a plan view of the assembly illustrated in FIG. 1.
Figure 8A:
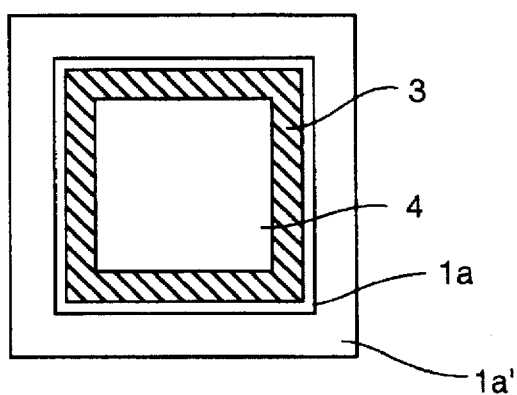
FIG. 8A is a plan view of a liquid crystal panel produced in a method in the first example, according to the present invention.
Figure 8B:
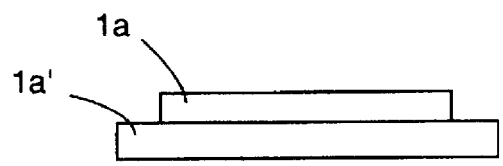
FIG. 8B is a side view of the liquid crystal panel shown in FIG. 8A.

FIG. 7 is a partial plan view of the assembly 100 shown in FIG. 1 obtained in the above-described method. The assembly 100 is scribed along cutting lines 5 on the upper base substrate 1 and cutting lines 6 on the lower base substrate 1'. Then, the assembly 100 is completely cut into a plurality of liquid crystal panels by applying stress on the base substrates 1 and 1'. One of such liquid crystal panels is shown in FIGS. 8A and 8B. FIG. 8A is a plan view, and FIG. 8B is a side view of the liquid crystal panel. In FIGS. 8A and 8B, reference numerals 1a and 1a' denote substrates of the liquid crystal panel obtained by the cutting. Reference numeral 3 denotes the seal pattern, and reference numeral 4 denotes a display area of the liquid crystal panel.

The assembly 100 may be cut using a dicing method, a method using a wire saw, or the like instead of a scribing method.

By the above-described method for producing a liquid crystal panel, the liquid crystal material has already been injected between the base substrates when the assembly is cut into a plurality of liquid crystal panels. Accordingly, injection of the liquid crystal material after the cutting is not necessary, and thus production yield is significantly improved.

EXAMPLE 2

In a second example, a liquid crystal panel as is illustrated in FIGS. 8A and 8B is produced in the same manner as in the first example, except that a dicing method is used to cut the assembly 100 into a plurality of liquid crystal panels.

Dicing is preferably performed to 70 to 95% of the thickness of each base substrate, and more preferably to 85 to 90% of the thickness. If dicing is performed to less than 70% of the thickness of each substrate, excessive stress is possibly applied to completely cut the assembly 100, which possibly breaks the base substrates 1 and 1'. If dicing is performed to more than 95% of the thickness of each base substrate, the base substrate itself is likely to be broken.

In the second example, dicing was performed by cutting to a depth of 0.95 mm while the thickness of each base substrate is 1.1 mm. As a dicing blade, B1A801SD800N50M51 produced by Disco Co., Ltd. was used. The rotation rate of the dicing blade is 1,000 rpm, and each base substrate is transported at a rate of 3 mm/sec.

In a method in the second example, the liquid crystal material has already been injected between the base substrates when the assembly is cut into a plurality of liquid crystal panels. Accordingly, injection of the liquid crystal material after the cutting is not necessary, and thus production yield is significantly improved.

Further, the liquid crystal material is completely sealed inside by the walls of the photocurable resin. Even if the base substrates are cracked during the dicing process, the cooling water does not go into the liquid crystal regions. Accordingly, the dicing can be performed more deeply, and thus even a base substrate having a thickness of as great as approximately 2 to 3 mm can be cut with certainty.

Even the base substrates formed of a material such as quartz glass or silicon which is very difficult to cut using a scribing method can be cut with certainty. Accordingly, an active matrix type liquid crystal panel which displays an image using a switching device provided on a substrate can be produced using a known technology for producing an integrated circuit which includes a MOS device. Accordingly, a silicon substrate can be easily used for such a liquid crystal panel.

EXAMPLE 3

Figure 9:
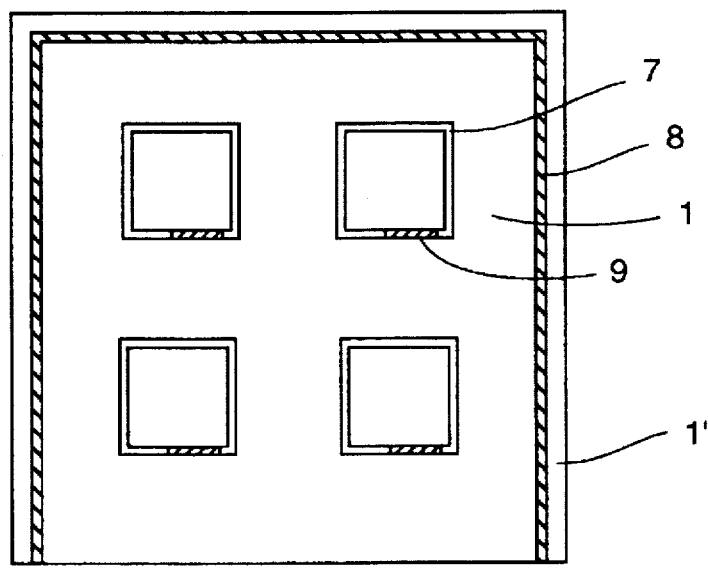
FIG. 9 is a plan view of an assembly from which a plurality of liquid crystal panels are to be obtained in a third example according to the present invention.
Figure 10:
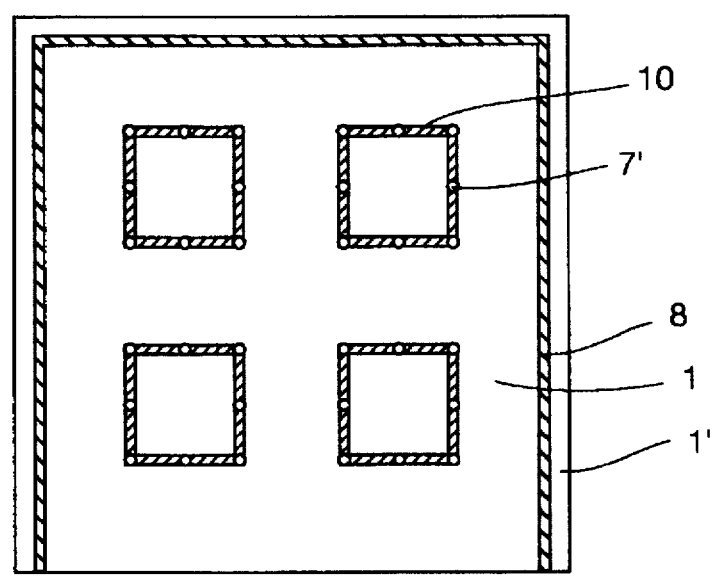
FIG. 10 is a plan view of an assembly from which a plurality of liquid crystal panels are to be obtained in a fourth example according to the present invention.

In a third example according to the present invention, a plurality of liquid crystal panels are produced in the following manner. As is shown in FIG. 9, seal patterns 7 each having an injection opening 9 and a dummy seal 8 are formed on the lower base substrate 1' by screen printing using a conventional sealing material. The upper base substrate 1 is positioned and laminated on the lower base substrate 1', and the two base substrates 1 and 1' are assembled together by curing the seal patterns 7 and the dummy seal 8 to form an assembly. A mixture of a photocurable resin and a liquid crystal material is injected to the assembly through the injection openings 9 by vacuum injection. By irradiating prescribed areas of the seal patterns 7 with light through a photomask (not shown), thereby forming liquid crystal regions and also curing the photocurable resin to seal the injection openings 9. The following process is performed in the same manner as in the first example.

The seal patterns 7, the dummy seal 8, and the injection opening 9 may be formed by, for example, drawing using a dispenser instead of screen printing.

In a method in the third example, the liquid crystal material has already been injected between the base substrates when the assembly is cut into a plurality of liquid crystal panels. Accordingly, injection of the liquid crystal material after the cutting is not necessary, and thus production yield is significantly improved.

Further, the upper and lower substrates of each liquid crystal panel adhere to each other more tightly due to the seal patterns 7. Acordingly, the assembly has an outstanding adhesion between the base substrates.

EXAMPLE 4

In a fourth example according to the present invention, a plurality of liquid crystal panels were produced in the same manner as in the third example except that dot-like seal patterns 7' each having a plurality of injection openings 10 are provided on the lower base substrate 1'.

In a liquid crystal panel produced in such a manner, the total area of the injection openings 10 is larger. Thus, the gap between the two base substrates can be filled with the mixture of a photocurable resin more easily.

EXAMPLE 5

In a fifth example according to the present invention, a plurality of liquid crystal panels are produced in the same manner as in the first example except that the assembly was irradiated with light using spot exposure.

Figure 11:
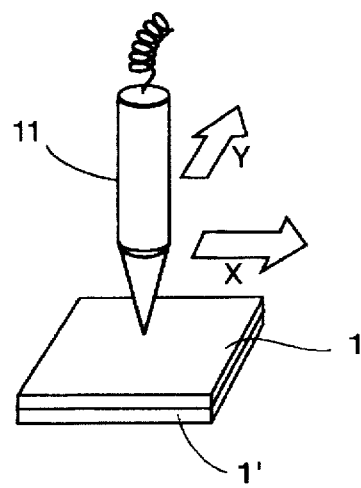
FIG. 11 is an isometric view illustrating the step of irradiating a prescribed area of an assembly with light in a method for producing a liquid crystal panel in a fifth example according to the present invention.
Figure 12:
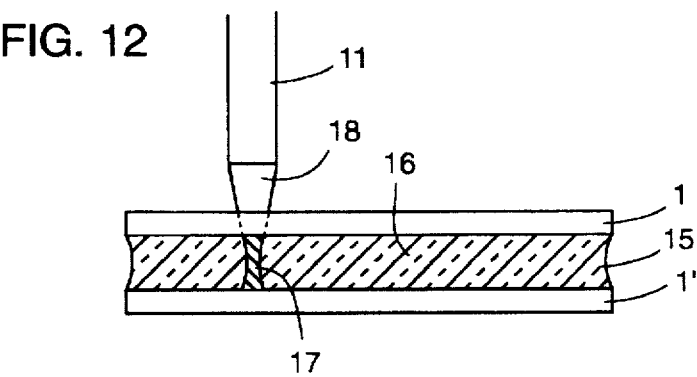
FIG. 12 is a schematic cross sectional view of the assembly illustrating the step shown in FIG. 11.

As is illustrated in FIG. 11, an optical fiber 11 is moved in the directions of arrows X and Y on one of the two base substrates (the base substrate 1 in FIG. 11) to draw a prescribed seal pattern. As is illustrated in FIG. 12, an area of the mixture 15 which has been treated by spot exposure is formed into a wall 17 and the rest of the mixture 15 becomes a liquid crystal region 16 by the principle described in the first example.

By such a method, a liquid crystal panel can be produced without using a photomask, which simplifies the production process. Especially when large base substrates are used for displaying an image on a large screen, the above-described method of using spot exposure significantly simplifies the structure of an apparatus for producing the liquid crystal panels when compared with a method of using a photomask which requires irradiation of the assembly with parallel light over a large area. Accordingly, production cost of the liquid crystal panels is significantly reduced.

EXAMPLE 6

Figure 13:
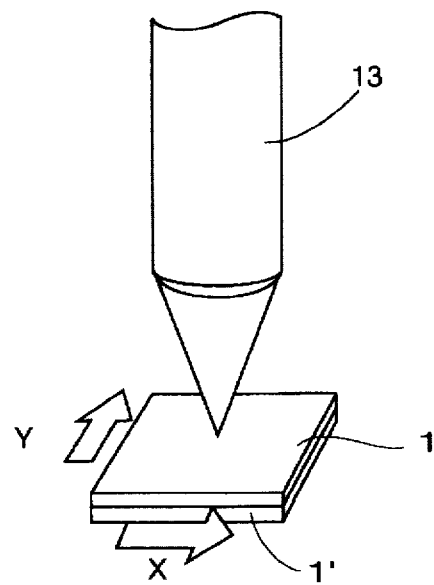
FIG. 13 is an isometric view illustrating the step of irradiating a prescribed area of an assembly with light in a method for producing a liquid crystal panel in a sixth example according to the present invention.

In a sixth example according to the present invention, a plurality of liquid crystal panels were produced in the same manner as in the fifth example except that an optical system 13 shown in FIG. 13 including a reducing lens having a large aperture diameter which is fixed with respect to the base substrates was used instead of the optical fiber 11. A prescribed pattern was drawn on one of the two base substrates (the base substrates 1 in FIG. 13) by moving the base substrates 1 and 1' in directions of arrows X and Y.

By such a method, the irradiation intensity can be higher than in the case where an optical fiber is used, and thus the drawing speed can be enhanced.

EXAMPLE 7

Figure 14:
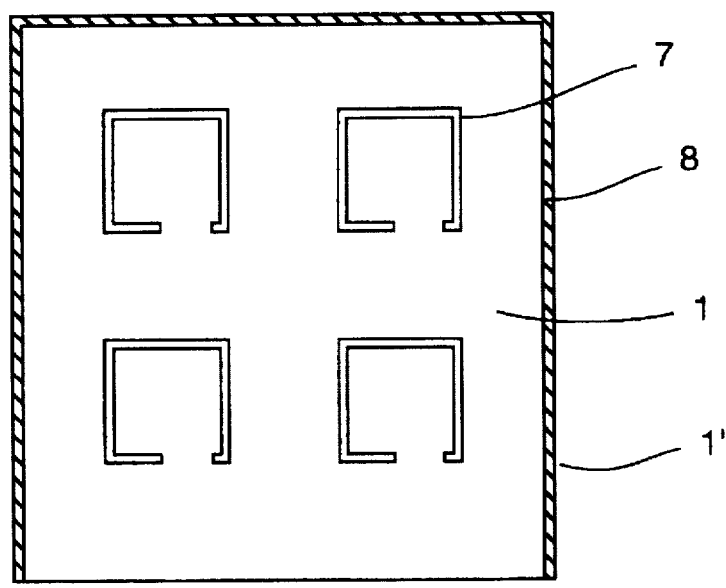
FIG. 14 is a plan view of an assembly from which a plurality of liquid crystal panels are to be obtained in a seventh example according to the present invention.

In a seventh example according to the present invention, a plurality of liquid crystal panels were produced in the same manner as in the third example except that the two base substrates 1 and 1' which are assembled together after formation of the seal patterns 7 were sealed at an outer periphery by a sealing resin 8' as is illustrated in FIG. 14.

By such a method, a larger number of liquid crystal panels can be produced from the same size of base substrates than in the third example since the provision of the sealing resin 8' at the outer periphery thereof reduces the dead area of the assembly. Further, the base substrates are sealed more tightly due to the sealing resin 8'.

EXAMPLE 8

A liquid crystal panel in an eighth example according to the present invention will be described with reference to FIG. 15. Although a plurality of liquid crystal panels are produced from an assembly including a pair of base substrates as in the previous examples, FIG. 15 shows only an area of the assembly corresponding to one liquid crystal panel for simplicity.

Figure 15:
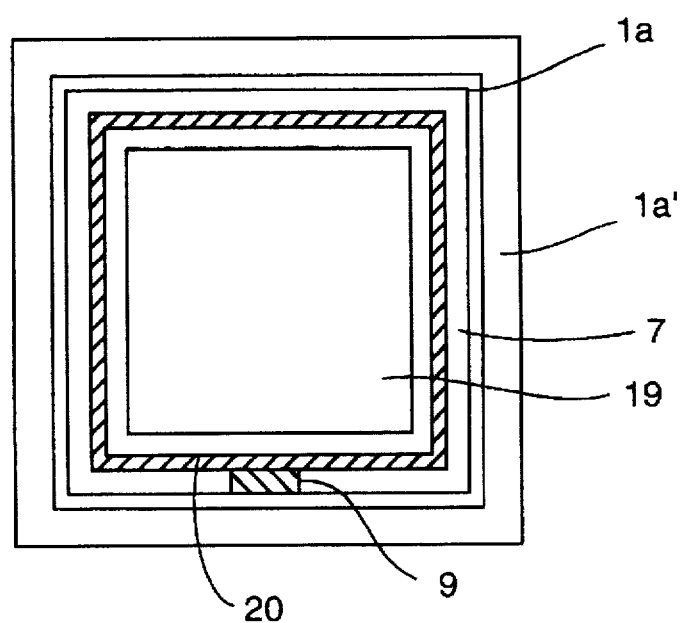
FIG. 15 is a plan view of a liquid crystal panel produced in a method in an eighth example according to the present invention.

As is shown in FIG. 15, a seal pattern 7 having an injection opening 9 is formed of a conventional sealing resin on a lower base substrate (indicated by reference numeral 1a' in FIG. 15), and further a dummy area 20 is formed inside the seal pattern 7 also of a conventional sealing resin. An upper base substrate (1a) is positioned and laminated on the lower base substrate (1a'). By curing the seal pattern 7 and the dummy area 20, the two base substrates are assembled together. A mixture of a photocurable resin and a liquid crystal material is injected by vacuum injection between the two base substrates through the injection opening 9. Light is radiated toward the injection opening 9, thereby curing the photocurable resin to seal the injection opening 9 and also forming a liquid crystal region.

By such a method, the area of the photocurable resin which is cured is not sufficiently large. Accordingly, the dummy area 20 inside the seal pattern 7 is irradiated to cure the photocurable resin which remains in the mixture in a display area 19. By such irradiation of the dummy area 20, influence of the photocurable resin on the display characteristics of the liquid crystal material can be substantially eliminated.

Figure 16:
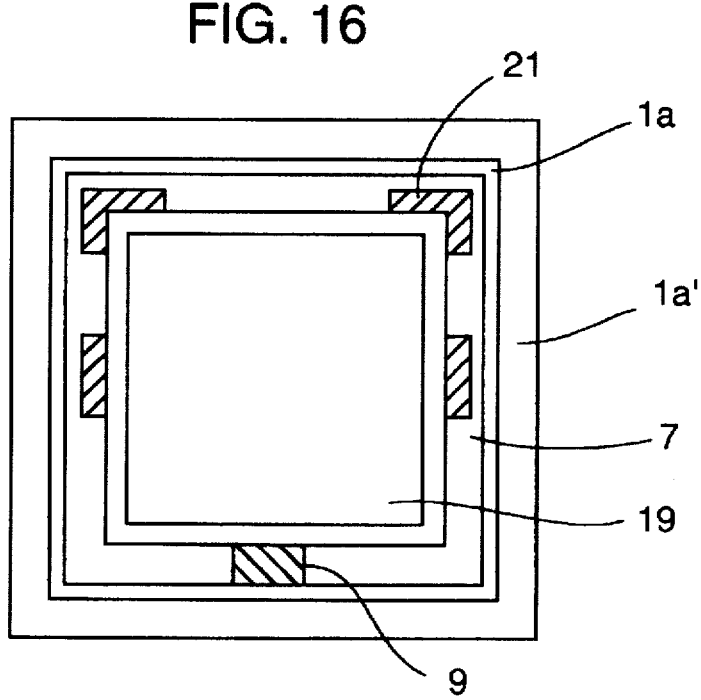
FIG. 16 is a plan view of a liquid crystal panel produced in a method in a modification of an eighth example according to the present invention.

The dummy area 20 may be provided in a desirable position of the seal pattern 7. For example, as is illustrated in FIG. 16, a plurality of dummy areas 21 may be provided locally in the seal pattern 7.

The dummy area 20 may be irradiated in any of the methods described above. Light radiation toward the dummy area 20 may be performed at any time after the injection opening 9 is sealed but preferably before the base substrates are cut into the substrates 1a and 1a' corresponding to one liquid crystal panel. By irradiating the dummy area 20 with light before the cutting of the base substrates, influence of the cooling water during the cutting process can be eliminated more effectively.

EXAMPLE 9

Figure 17:
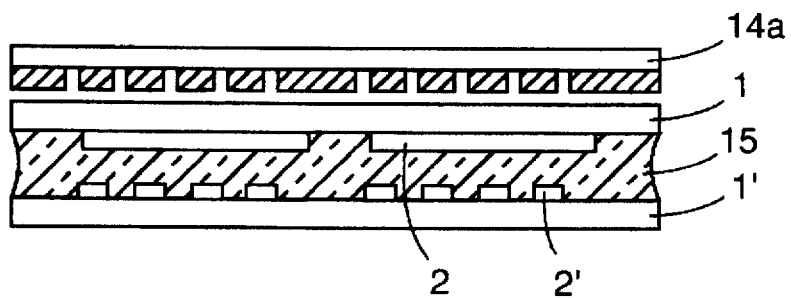
FIG. 17 is a schematic cross sectional view illustrating the step of providing a photomask used for aligning liquid crystal molecules in a method for producing a liquid crystal panel in a ninth example according to the present invention.
Figure 18:
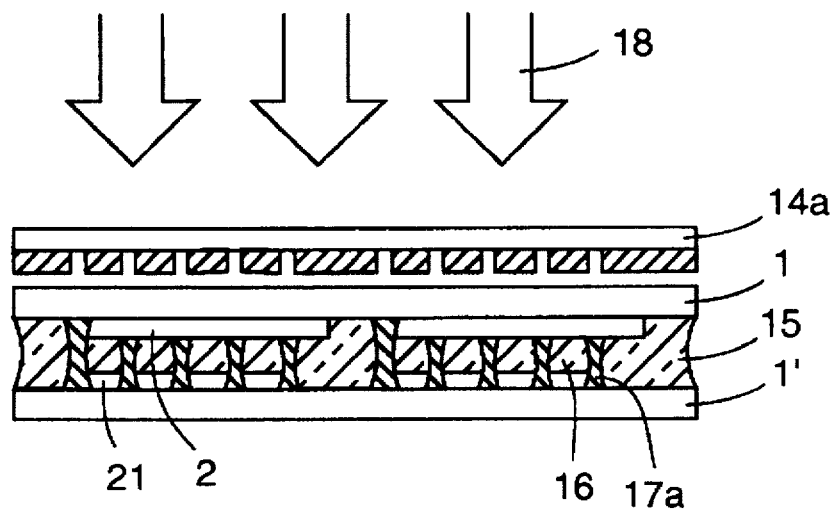
FIG. 18 is a schematic cross sectional view illustrating the step of irradiating an assembly with light to align liquid crystal molecules in a method for producing a liquid crystal panel in the ninth example according to the present invention.

A liquid crystal panel in a ninth example according to the present invention will be described with reference to FIGS. 17 through 19. As in the first example, a mixture 15 of a photocurable resin and a liquid crystal material is injected between two base substrates 1 and 1'. Instead of providing the alignment layers as in the first example, a photomask 14a having the same pattern as the pattern of the electrodes (namely, the pattern of pixel areas) is provided as is shown in FIG. 17. The assembly is irradiated with light through the photomask 14a to align the liquid crystal molecules.

The liquid crystal molecules are aligned in the same manner as is described in Japanese Laid-Open patent Publication No. 6-301015. In detail, as is illustrated in FIG. 18, the photocurable resin in areas of the mixture 15 which have been irradiated with the light, namely, in the areas between pixel areas 21 reacts to the light, and thus the photocurable resin obtains a concentration gradient. By the concentration gradient, the photocurable resin in the pixel areas 21 which have not been irradiated with the light moves to the areas irradiated with the light continuously, and thus the reaction to light proceeds.

In this example, the glass-transition temperature of the photocurable-resin after being cured (indicated by reference numeral 17a in FIG. 18) is preferably room temperature or higher, and more preferably 60° C. or higher. Due to the glass-transition temperature being in such a range, a desirable alignment state of the liquid crystal molecules can be achieved. Further, light radiation is preferably performed under such conditions as to avoid formation of a wall or a pillar of the photocurable resin in the pixel areas. Due to light radiation performed under such conditions, the liquid crystal molecules can be aligned radially or concentrically around the substantial center of each pixel area.

As a light source for the light radiation, a metal halide lamp, high pressure mercury lamp, or the like may be used. In this example, the irradiation is performed using a metal halide lamp, at an intensity of 10 $mW/cm^2$ for 10 minutes. The glass-transition temperature of the photocurable resin is about 120° C.

Figure 19:
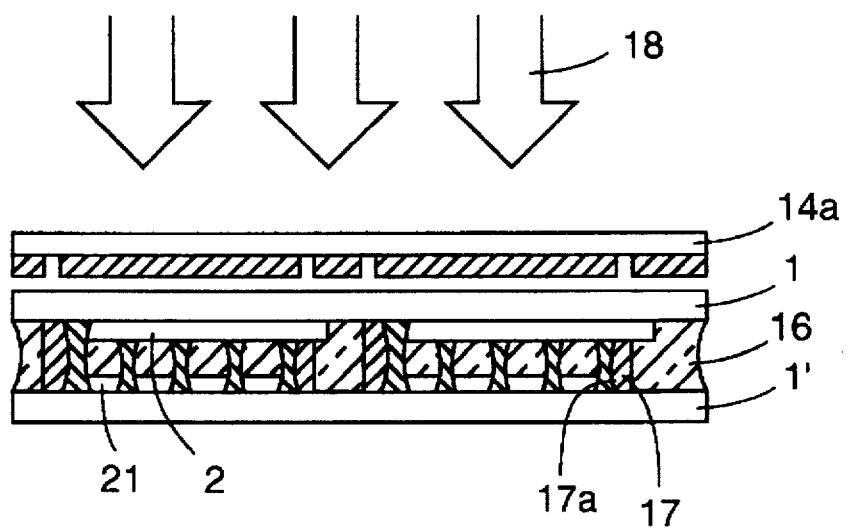
FIG. 19 is a schematic cross sectional view illustrating the step of irradiating prescribed areas of the assembly with light to form sealing sections in the ninth example according to the present invention.

Next, as is illustrated in FIG. 19, the assembly is irradiated with light through a photomask 14 which is designed to allow light to be radiated only to areas of the mixture in which the sealing sections 17 are to be formed, in the same manner as in the first example. Light radiation may be performed by spot exposure using an optical fiber instead of using a photomask. The alignment of the liquid crystal molecules may be performed simultaneously with formation of the sealing sections 17.

A liquid crystal panel produced in the above-described manner has a wide viewing angle and thus is suitable for a liquid crystal display device having a large display screen.

The above-described examples may be combined in any appropriate way.

As has been described so far, in a method for producing a liquid crystal panel according to the present invention, the liquid crystal material has already been interposed between the two base substrates and sealed inside by a wall of a photocurable resin when the assembly is cut into a plurality of liquid crystal panels. Accordingly, it is not necessary to inject the liquid crystal material after the cutting. As a result, the number of steps for producing a liquid crystal panel is significantly reduced when compared with conventional methods, and thus production yield significantly increases. Further, according to the present invention, an apparatus for injecting the liquid crystal material into a plurality of liquid crystal panels separately is not necessary, and thus production cost is reduced. Moreover, the cooling water and dust do not mix into the liquid crystal regions during the cutting process of the assembly. For such an advantage, various methods may be selected for cutting the assembly, and the resultant liquid crystal panels have high quality.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal panel including a liquid crystal material between two substrates secured together by a sealing section which is interposed therebetween and surrounds the liquid crystal material, the liquid crystal panel being produced by a method comprising the steps of:

positioning opposite each other two base substrates which are larger than the substrates of the liquid crystal panel in a completed state, leaving a gap between the two base substrates;

filling the gap between the two base substrates with a mixture of a photocurable resin and a liquid crystal material, and irradiating a prescribed area of the mixture with light to cause phase separation of the photocurable resin from the liquid crystal material and to cure the photocurable resin, thereby forming liquid crystal regions and sealing section frames which surround the respective liquid crystal regions to define a plurality of panels and securing the two base substrates together; and cutting the base substrates into a plurality of frame defined liquid crystal panels.

2. A liquid crystal panel produced by the method according to claim 1, wherein one of the two base substrates is larger and the filling of the gap comprises depositing the mixture on the larger substrate and transferring the mixture into the gap by capillary action.

3. A liquid crystal panel including a liquid crystal material between two substrates assembled together by a sealing frame which is interposed therebetween and surrounds the liquid crystal material, the liquid crystal panel being produced by a method comprising the steps of:

forming sealing frames of resin with one or more injection openings on the surface of one of two base substrates, forming a composite by positioning the base substrates, which are larger than the substrates of a liquid crystal panel being produced, opposite one another with the sealing frames of resin and a gap between the substrates, filling, through the one or more injection openings the gap between the two base substrates with a mixture of photocurable resin and a liquid crystal material, irradiating areas of mixture in the one or more injection openings with light to cure the mixture and cause phase separation of the photocurable resin from the liquid crystal material mixture and cure the photocurable resin in the one or more injection openings to close the openings, thereby forming a plurality of liquid crystal regions completely surrounded by frames of sealing resin and securing said two base substrates together, and cutting the composite into a plurality of liquid crystal panels.

4. A method for producing a liquid crystal panel including a liquid crystal material between two substrates secured together by a sealing section which is interposed therebetween and surrounds the liquid crystal material, the method comprising the steps of:

positioning opposite each other two base substrates which are larger than the substrates of the liquid crystal panel in a completed state, leaving a gap between the two base substrates; and filling the gap between the two base substrates with a mixture of a photocurable resin and a liquid crystal material, and irradiating a prescribed area of the mixture with light to cause phase separation of the photocurable resin from the liquid crystal material and to cure the photocurable resin, thereby forming liquid crystal regions and sealing section frames which surround the respective liquid crystal regions to define a plurality of panels and securing the two base substrates together.

5. A method for producing a liquid crystal panel according to claim 4 further comprising the step of cutting the base substrates into a plurality of frame defined liquid crystal panels while cooling with water after the sealing section is formed.

6. A method for producing a liquid crystal panel including a liquid crystal material between two substrates assembled together by a sealing frame which is interposed therebetween and surrounds the liquid crystal material, the method comprising the steps of:

forming sealing frames of resin with one or more injection openings on the surface of one of two base substrates, forming a composite by positioning the base substrates, which are larger than the substrates of a liquid crystal panel being produced, opposite one another with the sealing frames of resin and a gap between the substrates, filling, through the one or more injection openings the gap between the two base substrates with a mixture of photocurable resin and a liquid crystal material, irradiating areas of mixture in the one or more injection openings with light to cure the mixture and cause phase separation of the photocurable resin from the liquid crystal material mixture and cure the photocurable resin in the one or more injection openings to close the openings, thereby forming a plurality of liquid crystal regions completely surrounded by frames of sealing resin and securing said two base substrates together.

7. A method for producing a liquid crystal panel according to claim 6 further comprising the step of cutting the composite into a plurality of frame defined liquid crystal panels while cooling with water after the sealing section is formed.

* * * * *